United States Patent [11] 3,522,757

[72] Inventors: Josef Lohrer
Munich, Germany, Herbert Loos, Munich, Germany, Gianfranco Grandi, Munich, Germany, and Fritz Hurth, Munich, Germany
[21] Application No.: 676,105
[22] Filed: Oct. 18, 1967
[45] Patented: Aug. 4, 1970
[73] Assignee: Carl Hurth Maschinen und Zahnradfabrik, Munich, Germany, West a corp of Germany
[32] Priority: Oct. 26, 1966
[33] Germany, West
[31] No. H 60,860

[54] APPARATUS WITH SUPPLEMENTAL DRIVE FOR PRECISION WORKING OF GEAR WHEELS
6 Claims, Drawing Figs.
[52] U.S. Cl. .................................................. 90/1.6, 90/7
[51] Int. Cl. .................................................... B23f 19/08

[50] Field of Search .................................. 90/1.6, 3, 4, 7; 77/32.4, 32.7

[56] References Cited
UNITED STATES PATENTS

| | | | |
|---|---|---|---|
| 2,542,569 | 2/1951 | Praeg ........................ | 90/1.6 |
| 2,749,803 | 6/1956 | Miller ....................... | 90/1.6 |
| 3,254,543 | 6/1966 | Donath ..................... | 77/32.7-X |
| 3,289,536 | 12/1966 | Hurth ....................... | 90/1.6 |
| 3,055,271 | 9/1962 | Nakada ..................... | 90/4 |
| 3,152,422 | 10/1964 | Loxham .................... | 90/4-X |
| 3,204,532 | 9/1965 | Budnick ................... | 90/4 |

Primary Examiner— Gil Weidenfeld
Attorneys— Woodhams, Blanchard and Flynn

ABSTRACT: In a machine for cutting gears by use of a cutting tool operating in tight mesh with the workpiece, usually with the tool and workpiece in crossed-axes relationship with each other, profile errors are minimized by providing separate drive means for each of the tool and workpiece. Said profile errors are further minimized by automatically adjusting either or both of such drives to the reaction forces developed between the tool and workpiece in order to maintain a constant pressure on the tooth faces and thereby effect uniform cutting.

Patented Aug. 4, 1970

INVENTORS
JOSEF LOHRER
HERBERT LOOS
GIANFRANCO GRANDI
FRITZ HURTH
BY
Woodhams, Blanchard & Flynn
ATTORNEYS

U.S. PATENT 3,522,757
APPARATUS WITH SUPPLEMENTAL DRIVE FOR PRECISION WORKING OF GEAR WHEELS

This invention relates to an apparatus for precision manufacture of gear wheels by means of a tight mesh cutting relationship of toothed members comprising a workpiece and tool, for example for gear shaving.

During the cutting process, as involved in the precision manufacture of gear wheels, which takes place upon a tight mesh engagement of workpiece and tool, for example in gear shaving, gear honing and the like, either the tool or the workpiece is generally directly driven while the other thereof is driven from said direct driven element. This type of precision working creates profile errors on the flanks, so-called flank grooves, which are caused by relative movement between the workpiece and the tool, which movement in turn is due to random variations in the force distribution along the line of contact. Said random variations are caused by the changing number of the tooth flanks in engagement and by the reversal of the frictional forces at the contact point (point of contact of both operating pitch circles).

It is known to prevent said random variations by a suitable profile deviation (addendum modification) and by utilizing a suitable outer diameter of the tool. While this procedure has given good results, it has the disadvantage that a worktool provided for a certain workpiece is commonly used for only a limited selection of workpiece sizes. The capability for sharpening said worktools is also limited (German Patent No. 970 027 - U.S. Patent No. 3,180,227).

It is the purpose of this invention to overcome said deficiency, namely to provide means for using a certain tool, for example a cutter or a honing wheel, for a greater number of different workpieces.

It is already known in the case of gear lapping to drive simultaneously gears, which are in meshing engagement, namely, the gears of a gearing system. Said gear lapping is, however, carried out with a tooth clearance (back lash) like during operation of a gear system and thus does not deal with the problem which is the basis of the present invention. (German Patent No. 246 737, Page 2, line 21).

It is known for the running-in or lapping of bevel gears to drive by one motor each the engaged wheels which are to be lapped, wherein both motors are adjusted by a control member in a way that the right or left tooth sides lie against each other. Since this process also operates with some tooth clearance, it is related to the problem of the present invention (German Auslegeschrift No. 1 003 538, Column 3, lines 10-13).

A gear shaving machine is also known in which the workpiece and the tool are driven in proportion to their number of teeth respectively through drive means preventing a reverse drive (as a one way clutch). This is intended to prevent a relative rotation between the workpiece and the shaving wheel. Since the forces operate very rapidly during the cutting process and the machine elements provide a certain elasticity between the meshed elements and the drive means which prevent said reverse drive, these measures do not lead to a complete success (German Patent No. 1 155 305).

The basic purpose of the invention is to increase the range of application of the tools by means derived from the machine structure. In a narrower sense, a machine for precision work is provided with means which influence the forces acting between the workpiece and the tool.

To attain said purpose, the invention provides that a tool or the workpiece of known kind is driven (main rotational drive) as convenient, for example hydraulically, and that the other element (workpiece or tool) is provided additionally with an adjustable rotational drive. Because both rotational drives of the known shaving machine are proportional to the number of teeth, adjustment to the shaving force is not obtained but the effect of such forces is sensed by the elements which prevent a reverse drive or a back pressure on the teeth of the tool and workpiece. The invention overcomes the cause of said difficulty by making the supplemental rotational drive variable so that said drive can be adjusted to the shaving forces or that said drive can control said shaving forces. The invention is based on the fact that the forces acting in the zone of engagement of the teeth are of controlling importance and that the supplemental, adjustable, rotational drive is provided to control such forces.

While the above-disclosed invention is first of all directed to an average value of the working forces, one embodiment of the invention adjusts to the changing instantaneous forces in such a way that the supplemental rotational drive is altered during the cutting process.

In detail the invention can be carried out so that the supplemental rotational drive is controlled depending on the power input of the main rotational drive, or that said additional rotational drive is controlled depending on the torque of said main rotational drive.

Furthermore, the supplemental rotational drive can, according to the invention, be controlled directly or indirectly depending on the cutting force, whereby one can start from the radial, axial or tangential force component or the x-,y-,z- components (referring to the gearing in meshing engagement) or a resultant thereof.

The supplemental drive disclosed in the above-discussed examples acts directly onto the workpiece or the tool. To attain said purpose, the invention also provides that the carrier or the receiving means for the workpiece or the tool, for example the work support centers, is also driven during starting or slowing down. This part of the invention is secondary to the above-disclosed main thought of the invention.

The invention is described hereinafter by the embodiments illustrated in the drawings, in which:

FIGURE 1 is an illustration of a precision machine for making gear wheels to which the invention is applied.

Figure 2:
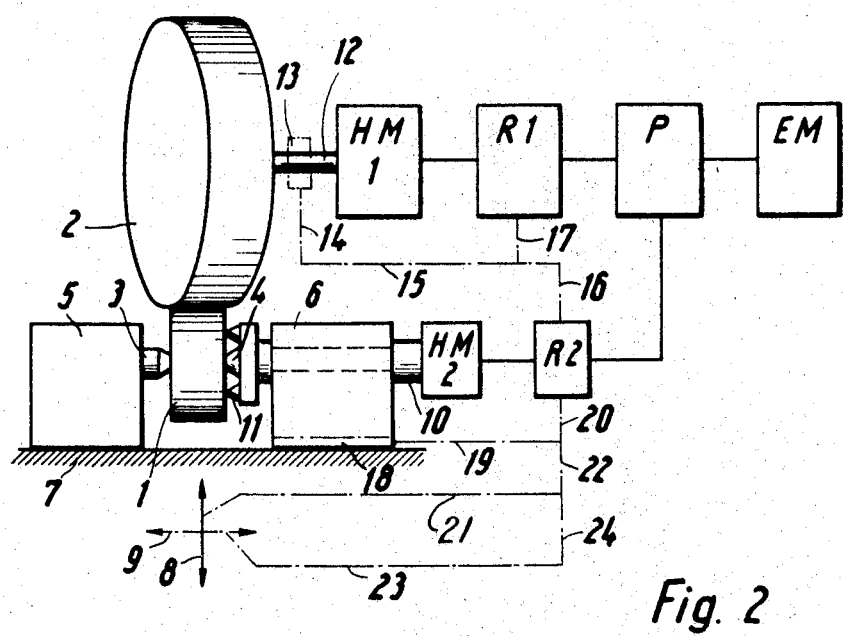
FIGURE 2 is a schematic view of one embodiment of the invention.

A bevel or spur gear 1 is to be worked for example by crossed axes with a cutter 2 or a honing wheel or other suitable worktool. The machine 30 is essentially comprised of a C-shaped machine frame 30, the upper arm 31 of said machine frame having a tool holder 32 for the tool 2 pivotably and fixably arranged thereon in a known manner in a plane 32a parallel to the tool axis. A carriage 33 is also supported movably and, in this case, fixably on the machine frame 30, said carriage being in a guide 33a directed perpendicularly to the aforementioned plane 32a of the tool carrier. A workpiece table 7 is arranged on the carrier, said carrier receiving the workpiece 1 between workholders 5 and 6 or the like so that said workpiece can be in mating engagement with said tool. The workpiece table is supported longitudinally movable on a guide 35 in a plane which is parallel to the above-mentioned pivot plane of the tool. For driving the longitudinal feed a feed screw 9' and a feed nut 9" are provided in a known manner. Said feed screw can be driven by an electric motor 36 through conventional drive and gearing means 36a, 36b. The base 37, of said feeding guide is arranged pivotably and fixably in a plane which is parallel to said aforementioned pivot plane 32a of the tool holder. Thus, the longitudinal feed can in a known manner, assume various directions. The superstructure 38 of the guide 35 is also pivotably and fixably connected to the workpiece table so that the axis of the workpiece 1 relative to the tool 2 can assume always the same position for all directions of the longitudinal feed 9 (FIGURE 2). A feed screw 8' and a feed nut 8" or a feed cam or both are provided in a known manner for the infeed. The infeed can be driven by an electric motor 40 through a gearing 47 or in any other convenient and known manner as shown in USA Patent No. 2,157,981 or 3,115,064.

Figure 1:
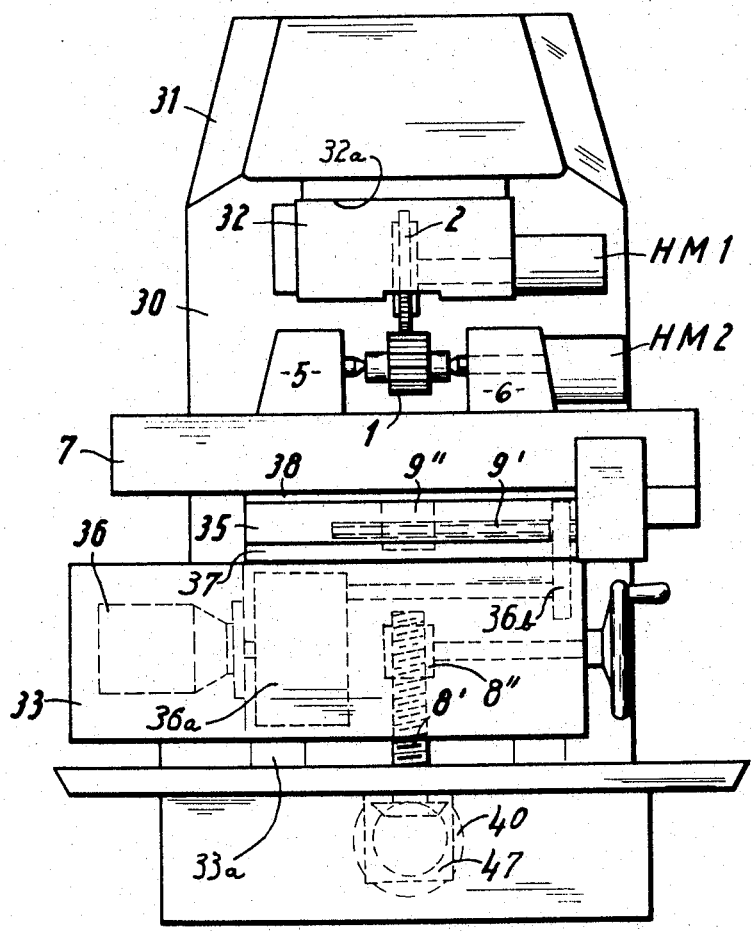
FIGURE 1 is a schematic view of a precision machine to which the invention can be applied.

The machine described in connection with FIGURE 1 is used only as an example for the description of the invention following thereafter. The invention is not limited to said machine structure but can be used on any known machine for precision working of gear wheels if the devices of the invention are attached thereto.

FIGURE 2 is a schematic illustration of an embodiment of the invention. The workpiece 1, for example a gear, is received for this purpose upon centers which are supported in work supports 5, 6 in a known manner. Said work supports are adjustably fixed onto the workpiece table 7 which is schematically indicated in FIGURE 2. Known means are provided such as those described in examples above, for changing the spacing between the workpiece 1 and the tool 2. Said means are schematically illustrated by the double arrow 8 in FIGURE 2. Further known means, such as those above described, can be provided, if desired to perform a back-and-forth adjustment parallel to the common tangential plane (identified as longitudinal feed) belonging to both the workpiece and the tool, schematically indicated by double arrow 9.

For driving the worktool 2, an electric motor EM is provided, said motor driving a pump P. The pump feeds operating fluid, for example oil, into a hydraulic motor HM-1 which drives the tool 2 through a shaft 12. The rotational speed of the hydraulic motor and thus of the tool is controlled by a control R1. Control R1 may be of any conventional type, for example, a fluid control valve disposed in a fluid line between the pump P and hydraulic motor HM1 and actuable to control the fluid flow to the hydraulic motor HM1. FIGURE 2 illustrates a plan which illustrates the logic connection of the series electric motor, pump, control, hydraulic motor and tool. Of course, the specific arrangement for a given case can differ from said illustrated system, for example the pump can feed pressure fluid directly to the hydraulic motor while the control controls, for example by known valve positioning, either the quantity being delivered by the pump or the capacity of the motor or both.

A second control R2 is provided for the workpiece 1 which controls an additional hydraulic motor HM-2. Said hydraulic motor HM-2 receives its operating pressure from the pump P. In addition the hydraulic motor HM-2 drives the workpiece 1. A work support, as at 6, is provided with a continuous rotatable spindle sleeve 10 and a known driver 11. The above-discussion with respect to the arrangement of the control R1 is the same as for control R2. Thus, control R2 may be of any conventional nature, for example, a fluid control valve disposed in a fluid line between the pump P and hydraulic motor HM2 and actuable to control the fluid flow to hydraulic motor HM2 in response to appropriate signals, for example, electrical signals, applied thereto as hereinafter discussed.

The additional rotational drive HM-2 is controlled according to the invention in response to the work forces.

A transducer 13 can for this purpose, for example, be provided on the shaft 12 for measuring the transmitted torque, said transducer applying its output to the control R2 through lines 14, 15, 16. Said control controls the additional rotational drive for example in such a way that the torque does not exceed a predetermined value. Depending on the sensitivity of the transducer and on the sensitiveness of the control, an average value of the torque or a torque developed during the cutting process can effect the desired control. The value of the torque can be delivered either directly or through a higher or lower ratio to the control. Torque measuring recorders are known. For example, elongated strip charts or measuring devices having reaction forces acting thereon can be used. Thus, the torque measuring device 13 may be of any conventional type such as, for example, a conventional torque measuring piezo-electric strain gauge provided if desired with suitable amplification and adapted to provide signals to control R2.

In order to control the additional rotational drive in response to the cutting speed, the control R1 can, for example, also act on the control R2 which was indicated in FIGURE 2 by the connection 16, 17.

The control R2 for the additional rotational drive can also be directly controlled by a reaction component of the working pressure. The possibility is indicated in FIGURE 2 by a pressure measuring device, for example by the pressure measuring device 18, beneath the work support 6. Thus, for example the device 18 may be a conventional piezo-electric strain gauge, provided if desired with suitable amplification, and adapted to provide signals to control R2 related to the working forces between the tool 2 and workpiece 1. In such an arrangement, working forces between the tool and workpiece of FIGURE 2 would result in corresponding forces on the workholder 6 and thereby on the measuring device 18 disposed between said work holder 6 and its supporting base 7. However, any other point on the workpiece or worktool carrier which receives the working pressure can be used for measuring the pressure. Suitable measuring devices are known. For example, hydraulic or electric measuring devices, elongated strip charts, piezo crystals and others can be used. An average value or a pulsating value can be measured and can be applied to the control R2 through conduits 19, 20.

In a similar manner it is possible to use the force of the infeed (indicated by conduits 21, 22, 20) or the force of the longitudinal feed (indicated by conduits 23, 24, 22, 20) to control the supplemental rotational drive. Thus, again, as in the case of the device 18, a corresponding conventional measuring device such as a piezo-electric strain gauge can be used to sense a force component, here in either of the feeds, related to the working force between the tool and workpiece and provide a corresponding signal to control R2.

Figure 3:
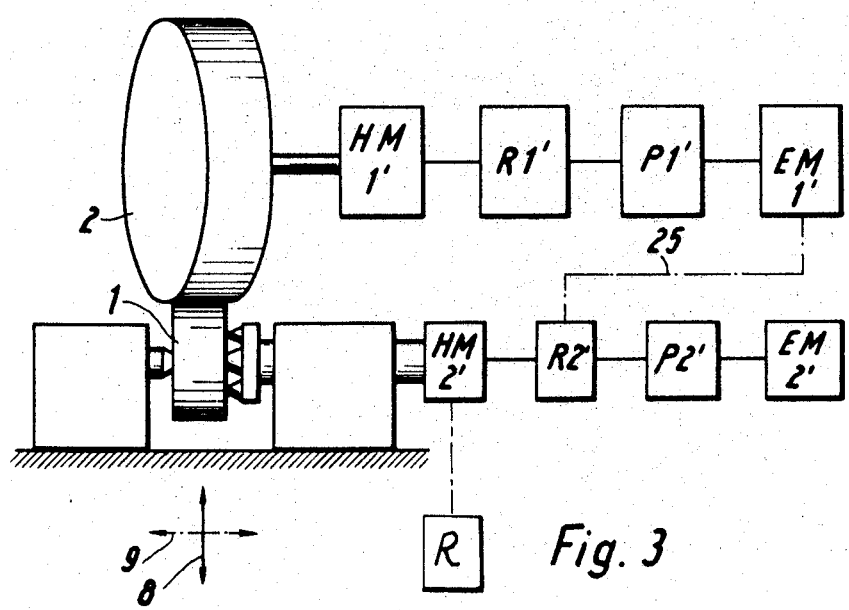
FIGURE 3 is a schematic view of a modified embodiment of the invention.

FIGURE 3 illustrates a further modified embodiment of the invention which differs from the embodiment of FIGURE 1 in that the additional rotational drive has its own pump P2' and its own electric motor EM2'. An electric valve of the main electric motor EM1' is used for a control responsive to the work, said valve acting directly or indirectly onto the control of the additional drive R2' through the connection 25.

The described invention eliminates various mistakes in the shape of the flanks. The tool or the points carrying the workpiece are supplementally driven to reduce the acceleration forces or the drag forces and unequal flank pressures are eliminated by providing the workpiece or the tool with a supplemental rotational drive. The element which would normally be driven merely by its interaction with the directly driven part is here provided with a direct supplemental drive.

The supplemental rotational drives HM2 or HM2' can also be pulsatingly energized by a source R (FIGURE 3) in such a manner that the otherwise increasing and decreasing tooth forces are essentially constant.

Although a particular preferred embodiment of the invention has been disclosed above in detail for illustrative purposes, it will be recognized that variations or modifications of such disclosure, which come within the scope of the appended claims, are fully contemplated.

We claim:

1. An apparatus for precision manufacture of gear-like workpieces, particularly adapted to minimizing profile errors, and including use of a tool, such apparatus comprising in combination:

means for engaging the tool with the workpiece;
    means for rotatably supporting said tool;
    means for rotatably supporting said workpiece;
    first rotary drive means for rotating said tool;
    second rotary drive means for rotating said workpiece;
    at least one of said rotary drive means being variable; and
    means responsive to the working forces between said tool and workpiece for varying the speed of said variable speed drive means in a direction for minimizing inaccuracy in the shape of the gear teeth produced on said workpiece.

2. An apparatus according to Claim 1 wherein said first rotary drive means includes a pump and means for driving same, a hydraulic motor for rotatably driving said tool and a flow control valve operatively disposed between said pump and hydraulic motor for controlling fluid flow therebetween and thereby the power of said hydraulic motor;

wherein said second rotary drive means comprises a second hydraulic motor for rotatably driving said workpiece and a flow control valve operatively disposed between said pump and said second hydraulic motor for controlling fluid flow therebetween; and wherein said working force responsive means includes working force sensing means and further means responsive thereto and connected to one of said fluid valves for varying the setting of said one valve in relation to the output of said working force sensing means.

3. An apparatus according to Claim 1 wherein said first and second rotary drive means each include a pump and means for driving same, hydraulic motors for rotatably driving said tool and workpiece and a fluid flow control valve operatively disposed between each corresponding pump and hydraulic motor for regulating the power of said hydraulic motor; and wherein said working force responsive means includes working force sensing means and further means responsive thereto for controlling one of said values in relation to the output of said working force sensing means.

4. An apparatus according to Claim 1, characterized in that the means responsive to the working forces comprises means responsive to the power supplied by either of said rotary drive means.

5. An apparatus according to Claim 1, characterized in that the means responsive to the working forces comprises means responsive to the torque on the other of said rotary drive means.

6. An apparatus for precision finishing of gearlike work pieces by a gearlike tool in backlashfree meshing engagement comprising:

means for engaging the tool and workpiece;
a rotatable support to carry the tool;
a rotatable support to carry the workpiece;
first rotary drive means for rotating the tool;
second rotary drive means for rotating the workpiece; and
means for accelerating and decelerating the workpiece in response to a change in the working force between the tool and workpiece for minimizing inaccuracy in the shape of the gear teeth produced on said workpiece.